Nov. 7, 1933.　　　　F. S. SCHLESINGER　　　　1,934,331

COMBINATION FLASH LIGHT AND CAMERA

Filed June 4, 1932

WITNESSES
Edw. Thorpe
A. D. Kitchin

INVENTOR
Frederick S. Schlesinger
BY Munn & Co.
ATTORNEY

Patented Nov. 7, 1933

1,934,331

UNITED STATES PATENT OFFICE 1,934,331

COMBINATION FLASH LIGHT AND CAMERA

Frederick S. Schlesinger, New York, N. Y.

Application June 4, 1932. Serial No. 615,417

2 Claims. (Cl. 240—6.4)

This invention relates to an improved combination flashlight and camera, the object being to provide in combination with a camera an electric light embodied in the camera, or operably connected thereto, so as to provide the desired light when using the camera.

Another object is to provide in a camera of any desired type an electric light and connected parts including a battery and hand switch for projecting a light toward the object to be photographed, the structure being embodied in the camera body, but with the switch so positioned as to be temporarily or permanently closed.

An additional object is to provide in combination with a camera of any desired type means for removably receiving a special or standard type of flashlight, the structure being such that the light may be arranged on either side of the camera to illuminate dark or shaded areas near the object to be photographed.

A still further object of the invention is to provide in a camera a lighting system which may be used, if desired, in taking photographs, or may be used without taking photographs, so that in a single article a camera or flashlight may be presented which is capable of being used separately and also together.

In the accompanying drawing,—

Figure 1:
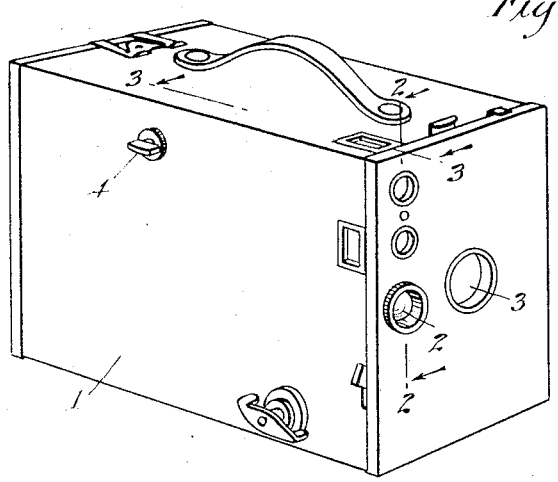
Figure 1 is a perspective view of a conventional camera disclosing an embodiment of the invention.

Referring to the accompanying drawing by numerals, 1 indicates what is commonly known as a box camera, and mounted in this camera and forming part thereof are elements making up a lighting system for providing a light on an object to be photographed or to be examined without photographing. In the drawing a box type of camera has been shown, but it is evident that any desired form of camera may be used without departing from the spirit of the invention. For the purpose of illustration, however, the invention has been applied to a box camera and will be described in connection therewith.

As illustrated in Figure 1, a light bulb socket 2 is arranged at one side of the lens 3. Also, as shown in this form of the invention, a switch 4 is conveniently positioned to be closed temporarily or for some length of time. It is desired to have the switch 4 closed only during the actual taking of the picture or making the exposure, though, ordinarily, the switch 4 is closed and then the mechanism of the camera operated to make the exposure. After this has been done, the switch 4 is opened.

Figure 4:
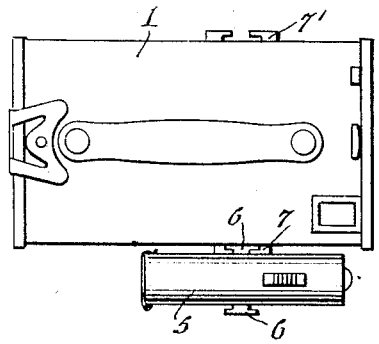
Figure 4 is a top plan view of a camera similar to that shown in Figure 1 but disclosing a different embodiment of the invention.

Quite often in making an exposure to take a picture of a certain object, the object will be well illuminated on one side and part of the front, while on the other side it may be more or less in a shadow. By providing the bulb 2 and associated parts, a better illumination will be secured over the entire object. In Figure 4 particularly, the structure is such that the light may be directed to either side of an object. As illustrated in this figure any desired form of flashlight 5 is provided and to which is secured a pair of supporting brackets 6 adapted to removably slide on the supporting bracket 7 which is rigidly secured to the camera 1. A similar bracket 7' is positioned on the opposite side of the camera so that if the shadow is on the right of the object, the flashlight 5 will be used as shown in Figure 4. If the shadow is on the left side, the flashlight 5 will be removed from the bracket 7 and slipped on to the bracket 7'.

Figure 2:
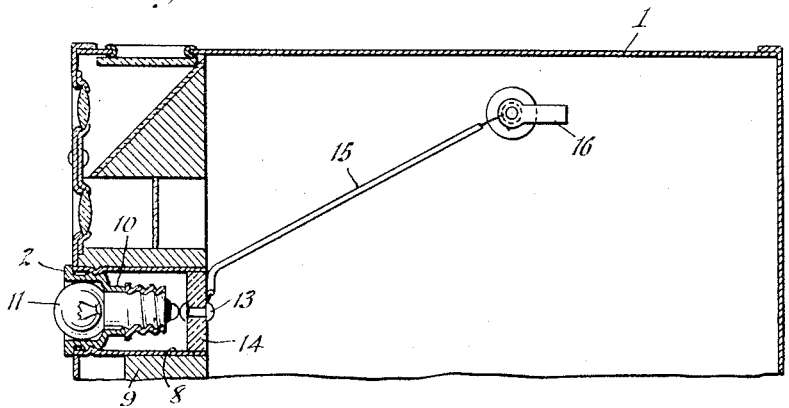
Figure 2 is an enlarged vertical sectional view through Figure 1 approximately on line 2—2.
Figure 3:
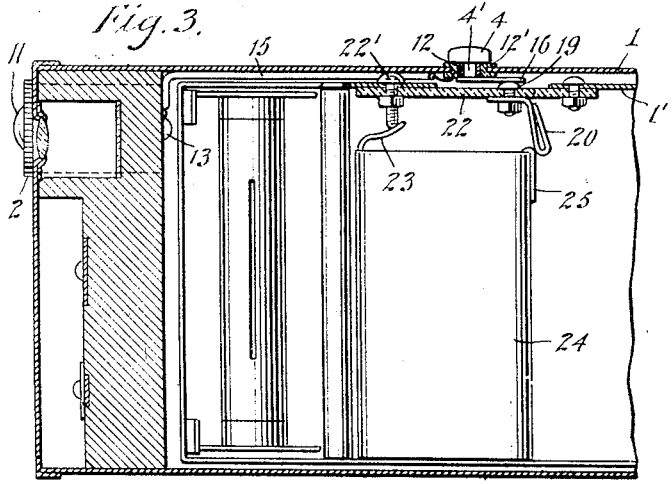
Figure 3 is an enlarged horizontal sectional view through Figure 1 approximately on line 3—3.

However, in the form of the invention shown in Figures 1 to 3, the invention has been embodied in a lighting system which secures the desired result while forming really a part of the camera body. As shown in Figure 2, there is provided a metal sleeve 8 in the front 9 of the camera 1, said sleeve preferably extending entirely through the front so that the socket 10 for the reception of the electric bulb 11 may be screwed therein and held so that the sides of the socket will contact with the metal sleeve 8. The central contact of the socket 10 is positioned to engage the end of the rivet 13 which projects through an insulating block 14. Wire 15 extends from the rearward screw or other contact member 13 to the switch 4 where it is fastened by soldering or otherwise to the metal sleeve 12 embedded in the insulating member 12'. The switch 4 is provided with a shaft 4' which is rigidly secured to the resilient contact 16 so that the structure just described in effect connects wire 15 to the resilient contact 16. When the light is turned on the parts are in the position shown in Figure 3 but if the switch was turned so that the resilient contact 16 was out of engagement with the contact 19, the bulb 11 would be deprived of current. Contact 19 is shown as a bolt and extends through the insulating plate 22 and acts, in addition to being a contact, as a clamping member for clamping the resilient member 20 to the plates and an electrical plate connecting the same with the contact 19.

From Figure 3 it will be noted that one of the bolts, namely, bolt 22' which holds the insulating plate 22 in position, acts also as a ground for the terminal 23 of battery 24. The opposite terminal, namely, terminal 25 is brought into frictional engagement with the resilient contact 20 when the battery is placed in position, thus the respective contacts not only act as contacts but as resilient holding means for holding the battery 24 in the desired position. It will thus be noted that the battery 24 is grounded on one side while the other side is adapted to be electrically connected with the switch 4 for closing the circuit. A desirable form of swinging switch has been illustrated but it will be evident that a sliding switch or other form of switch may be used without departing from the spirit of the invention.

When the device has been properly installed in the camera, as shown in Figures 1 to 3, the camera may be used in the usual manner without touching the lighting system. However, when the light is not just right to secure the best results, the cameraman may close the switch 4 with the result that the object to be photographed will be illuminated in a better way with the result that the picture taken will be much clearer. Whenever the battery 24 becomes exhausted it may be readily removed and a new one substituted. The bulb 11 also may be removed and a new one supplied whenever desired as this bulb is one now in common use.

The lighting system just described coacts with the camera to produce more detail in the picture when additional light is desired during the exposure of a film. However, whenever desired the lighting system could be used without operating the shutter of the camera, thus causing the entire device to be a combined camera and flashlight capable of being used together for securing a single result, namely, a good exposure, or the light may be used separately to locate objects or illuminate a pathway, or for other purposes as desired.

I claim:—

1. A combination of flashlight and camera including a camera structure having a casing, a sleeve fitted in said casing, an electric socket fitted into said sleeve, said socket being adapted to carry an electric bulb, means for grounding said socket on said casing, an electric battery, and means including said battery and a switch, said means coacting with the casing and the central terminal of said socket for completing the circuit of said socket, whereby when said switch is closed said electric bulb will be lighted.

2. A combination flashlight and camera including a camera structure, a lamp provided with a socket carried by the camera structure, a battery arranged within the casing of the camera structure, a rigid contact and a resilient contact for removably clamping said battery in place, said contacts engaging the terminals of said battery and conductors connecting said contacts with the terminals of said socket, all of said means being within the camera structure, one of said conductors having a switch provided with a portion extending to a point exteriorly of the camera structure.

FREDERICK S. SCHLESINGER.